Dec. 19, 1967

W. O. BENNETT ETAL

ELECTRONICALLY-CONTROLLED TIMEPIECE AND MOTION TRANSFORMER THEREFOR

Re. 26,322

Original Filed Jan. 19, 1961

2 Sheets-Sheet 1

INVENTORS
WILLIAM O. BENNETT
WILLIAM W. MUTTER
EGBERT VAN HAAFTEN

BY Michael Ebert

ATTORNEY

INVENTORS
WILLIAM O. BENNETT
WILLIAM W. MUTTER
BY EGBERT VAN HAAFTEN
Michael Ebel
ATTORNEY United States Patent Office Re. 26,322
Reissued Dec. 19, 1967

26,322

ELECTRONICALLY-CONTROLLED TIMEPIECE AND MOTION TRANSFORMER THEREFOR

William O. Bennett, Bayside, N.Y., and William W. Mutter, Paramus, and Egbert Van Haaften, Closter, N.J., assignors to Bulova Watch Company, Inc., New York, N.Y., a corporation of New York Original No. 3,184,981, dated May 25, 1965, Ser. No. 302,956, Aug. 19, 1963, which is a division of Ser. No. 89,896, Jan. 19, 1961. Application for reissue May 10, 1967, Ser. No. 641,738

5 Claims. (Cl. 74—142)

Matter enclosed in heavy brackets [ ] appears in the original patent but forms no part of this reissue specification; matter printed in italics indicates the additions made by reissue.

*ABSTRACT OF THE DISCLOSURE*

*An electronic timepiece wherein a vibratory element, such as a tuning fork, constitutes the timekeeping standard and wherein the timepiece gear works are driven by a toothed index wheel, the vibratory action of the element being translated by a motion transformer into rotary motion at a rate which depends on the vibratory rate of the element and is substantially independent of variations in amplitude of the element, the motion transformer being constituted by an index finger attached to the element and extending therefrom to engage the teeth of the wheel to transmit turning pulses thereto, turning of the wheel in the reverse direction being prevented by a pawl, the interrelation between the pawl and the index finger with respect to the teeth on the wheel being adjusted to a point at which the phase between the finger and pawl is several teeth plus one half tooth.*

This invention relates generally to electronically-controlled timepieces which incorporate electromagnetically-actuated tuning forks, and more particularly to an improved motion transformer for translating the vibratory movement of the fork into rotary movement for operating the gear train of the timepiece. This application is a division of our copending application Ser. No. 89,896 filed Jan. 19, 1961, now abandoned.

In ordinary electric watches, make-and-break contacts are mechanically operated by the swinging of the balance wheel. Each time these contacts close, battery current flows in a coil or coils to electro-magnetically impulse the balance wheel. This mechanically operated make-and-break contact system is subject to wear and also to deterioration and contamination of the delicate contact points which must open and close an electric circuit without fail 216,000 times a day. The slightest sparking will cause rapid deterioration of these contacts and early failure of the watch.

The present invention does away with a balance wheel and escapement as well as make-and-break contacts and makes use of a timekeeping tuning fork which is pulsed electromagnetically by means of a transistor circuit. It constitutes an improvement over timepieces of the type disclosed in the copending application, Ser. No. 665,480, filed June 13, 1957, entitled, "Electronically-Controlled Timepiece," now Patent No. 2,971,323, and in Ser. No. 584,709, filed May 14, 1956, entitled, "Electrical Timepiece," now Patent No. 2,960,817.

In said copending applications there are disclosed novel timepieces including a self-sufficient timekeeping standard formed by a tuning fork having a predetermined natural frequency and a battery-energized transistorized drive circuit to sustain the vibratory motion of the fork. This motion is transferred to a rotary movement including the usual gear train and dial pointers by means of a pawl attached to one tine of the fork, the pawl advancing a ratchet wheel which drives the gear train.

It is the principal object of this invention to provide a motion transformer for converting the reciprocating action of the tuning fork into rotary motion, the transformer including a ratchet wheel which is caused to advance only one tooth for each forward stroke of an index finger, despite variations in the length of the stroke by reason of variations in the amplitude of the tuning fork.

For a better understanding of the invention as well as other objects and further features thereof, reference is made to the following detailed description to be read in conjunction with the accompanying drawings wherein like components in the several figures are identified by like reference numerals.

Figure 4:
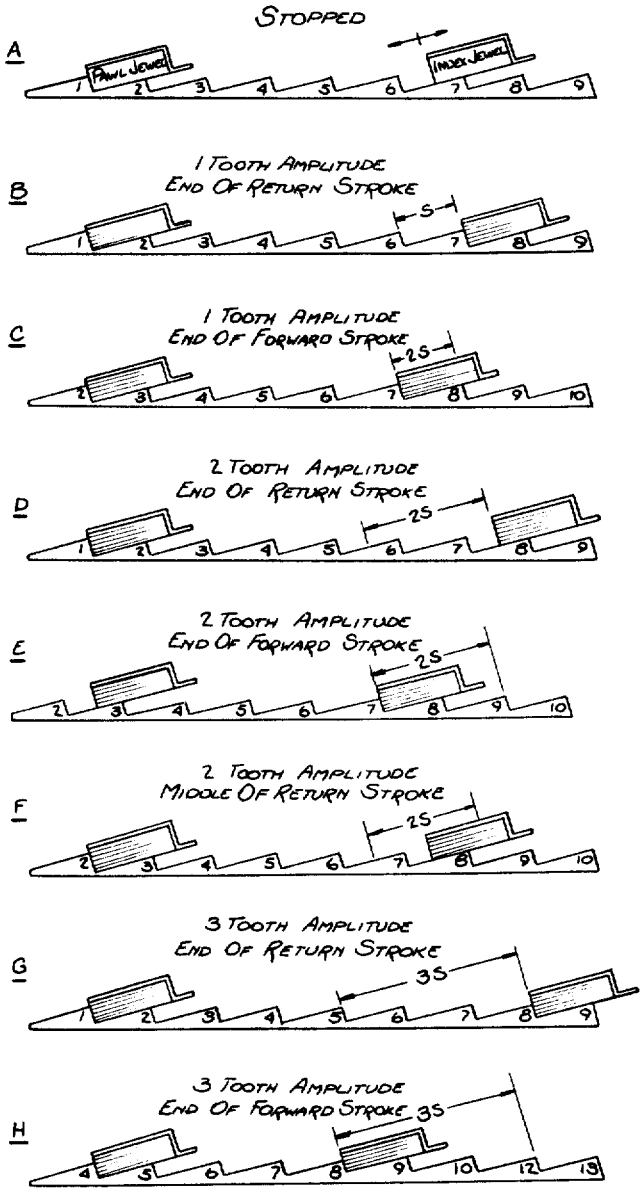

FIG. 4, A to H, demonstrates the operation of the index mechanism in the motion transformer.

Figure 1:
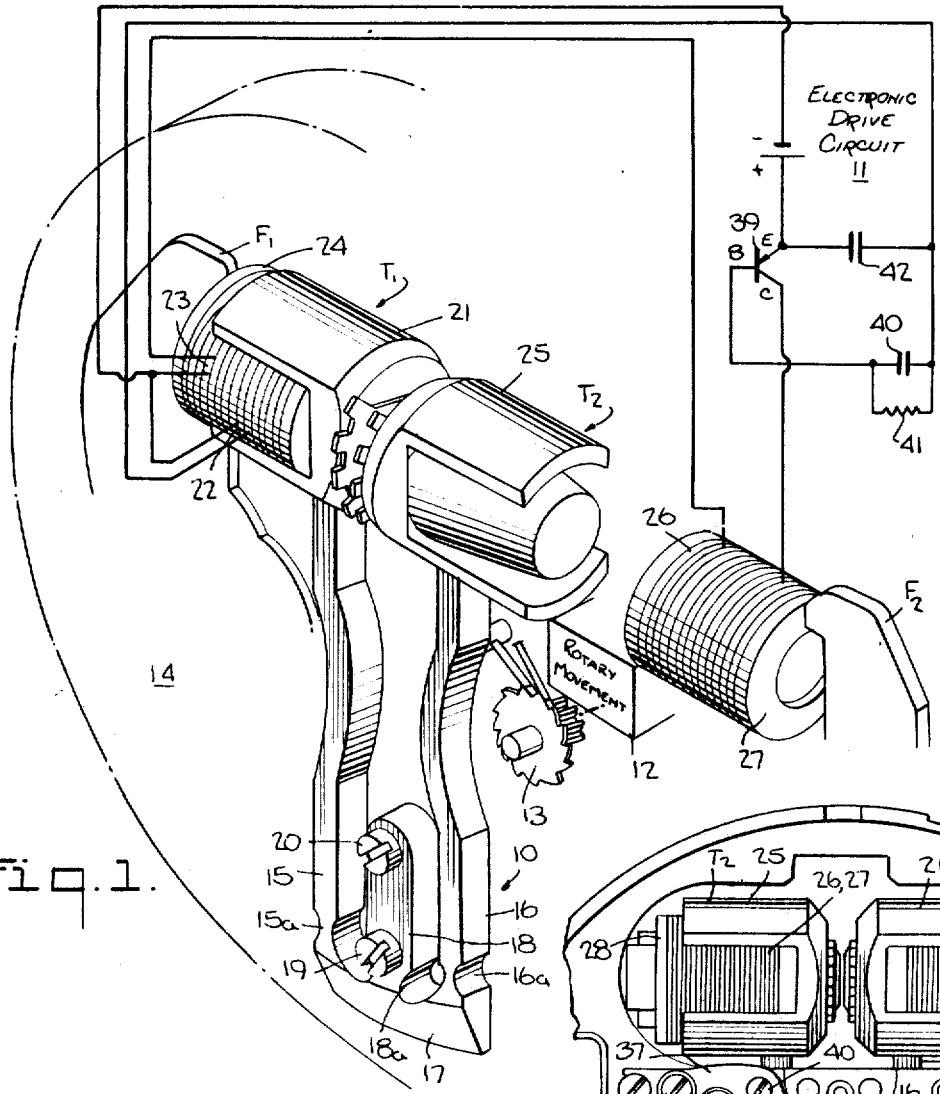
FIG. 1 is a schematic representation, in perspective, of the basic components of an electronic timepiece in accordance with the invention.

Referring now to the drawings and more particularly to FIG. 1, the major components of a timepiece in accordance with the invention are a timekeeping standard constituted by a tuning fork 10 and an electronic drive circuit 11 therefor, a rotary movement of conventional design including a gear train 12 for turning the hands of the timepiece, and a motion transformer including an index wheel 13 operatively intercoupling the fork 10 and the rotary movement 12 and acting to convert the vibratory action of the fork into rotary motion. The tuning fork has no pivots or bearings and its timekeeping action is therefore independent of the effects of friction.

All of the electrical components of the drive circuit are mounted on two unitized sub-assembly units or modules $F_1$ and $F_2$ attached to a disc-shaped metallic pillar plate 14 which may be supported within a watch casing of standard design or within any other type of housing, depending on the use to which the timepiece is put.

Tuning fork 10 is provided with a pair of flexible tines 15 and 16 interconnected by a relatively inflexible base 17, the base being provided with an upwardly extending stem 18 secured to the pillar plate by suitable screws 19 and 20. The central area of the pillar plate is cut out to permit unobstructed vibration of the tines.

The tuning fork is actuated by means of a first transducer $T_1$ constituted by a magnetic element 21 secured to the free end of tine 15, the element coacting with a drive coil 22, and a phase sensing coil 23. Drive coil 22 is wound on an open ended tubular carrier 24 affixed to a sub-assembly mounting form $F_1$ which is secured to pillar plate 14. Coils 22 and 23 may be wound in juxtaposed relation on carrier 24 or the phase sending coil 23 may be wound over drive coil 22.

A second transducer $T_2$ is provided constituted by a magnetic element 25 secured to the free end of tine 16 and coacting with a drive coil 26 wound on a tubular carrier 27.

The vibratory motion of the tuning fork is converted by a motion transformer into rotary motion. This transformer is constituted by a ratchet and pawl mechanism operated by the tuning fork to drive index wheel 13. This wheel in a working embodiment has a large number of teeth (300) and a diameter of only 95/1000 of an inch, the length of each tooth being 8/10,000 of an inch.

The exact operation of the indexing mechanism must be understood in order to appreciate the reliability of the entire mechanism. Obviously, because of motions, shock, and other environmental effects, it is not practical to maintain an exact amplitude for the vibrations of the the tuning fork. The following discussion will show that it is not necessary.

Figure 2:
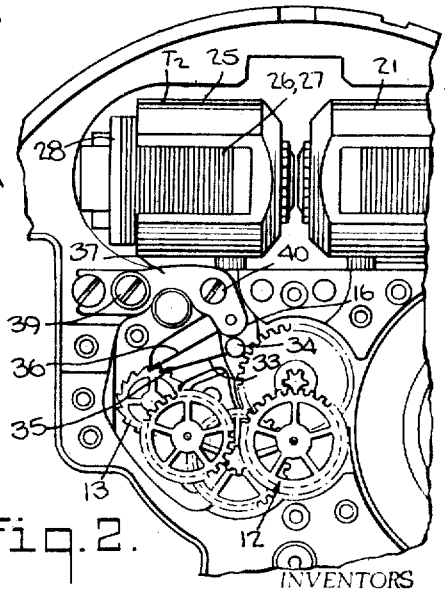
FIG. 2 is a plan view of the movement as seen on the gear train side of the watch.
Figure 3:
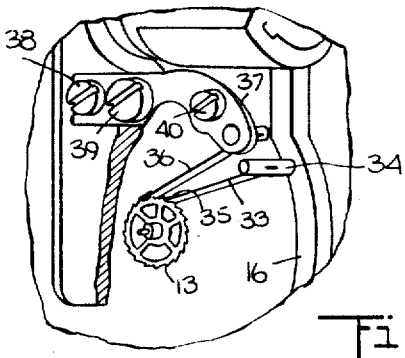
FIG. 3 is a separate view showing the motion transformer for the timepiece.

FIGS. 2 and 3 provide a very much magnified view of the relationship between the index wheel 13 and the two jewels in contact therewith. The index wheel 13 acts as the actuator for the rotary movement 12 and it is therefore essential that this wheel be advanced by vibratory fork at a constant rate. This is effected by means of an index finger 33, which is soldered or otherwise attached to a post 34 secured at one end to tine 15, post 34 having a constriction 34a therein to provide a bending neck.

The index finger is in the form of a light leaf spring and carries a tip 35 which may be a precious or semi-precious stone, such as sapphire. The tip engages the teeth of index wheel 13 so that the oscillations of the tine transmit turning impuses to the wheel. The shaft of the wheel is provided with a pinion which intermeshes with the first gear in the gear train 12.

Operating in conjunction with index wheel 13 is a pawl 36 whose design is similar to that of the index finger, the pawl being secured to an arm 37 pivotally attached to the pillar plate. The position of arm 37 may be adjusted by means of cam member 38 and locked by locking screw 39. Arm 37 pivots about screw 40.

The index finger and pawl are both tensioned downwardly, the jewelled tips thereof being parallel with the teeth of the index wheel. The tension is such that when the finger is retracted, there is sufficient reverse torque to cause the wheel to reverse direction. This back-up however is arrested by the pawl which is phased several teeth plus one-half tooth from the finger and is positioned in advance thereof in the direction of wheel rotation.

It would not be practical to maintain an exact amplitude for vibrations of the tuning fork in a wrist timepiece and the operation of the motion transformer is such that this is not necessary.

It will be noted that the spring forces on the index jewel 35 and pawl 36 not only hold them in firm contact with the index wheel 13 but they also exert a torque on this wheel, in the direction opposite to its forward motion. This torque causes the index wheel to back up during the first portion of the return stroke of the index jewel, until it is engaged by the pawl jewel. This torque is the result of the geometry of the system and is similar to the "draw" in a conventional escapement which tends to hold the pallet fork against the banking pin.

FIG. 4 is a diagrammatic representation of what is happening in the index mechanism when the fork is oscillating. At rest (FIG. 4A), the pawl is against one of the teeth (because of the "draw" effect described above) and the index jewel is located several teeth away, in a position halfway between two of the teeth.

Let us now look at what happens when the fork vibrates at various amplitudes. And for the purpose of simplicity, let us use the distance between teeth as a measure of this amplitude.

FIGS. 4B and 4C show a complete cycle of oscillation at an amplitude of one tooth (from ½ tooth right to ½ tooth left of the rest position). Note that in going to the right ½ tooth, the index jewel picks up another tooth, and on its return stroke to the left it drives the wheel far enough for the pawl jewel to drop off the end of tooth #2, so that we have achieved a movement of one tooth. You can see that further oscillations at the one-tooth level of amplitude would exactly one tooth per cycle.

Now let us look at FIGS. 4D, 4E and 4F to see what happens when we increase the amplitude to two teeth (one tooth to the left and one tooth to the right of the rest position). Note that the index jewel, in going one tooth to the right, drops off tooth #7, and goes halfway along tooth #8. On the return stroke, however, the first half tooth of travel accomplished no movement of the index wheel, since the index jewel does not begin to drive the wheel until it strikes tooth #7. Also note that in FIG. 4E, tooth #2 passes beyond the pawl jewel; but after the start of the return stroke the "draw" effect exerts force on the wheel to bring it back ½ tooth to the position shown in FIG. 4F. Thus, even with a two-tooth amplitude, we have achieved only one tooth rotation per cycle of oscillation.

FIGS. 4G and 4H show the effect of a three-tooth amplitude. Note that the index jewel, in going to the right 1½ teeth, picks up tooth #8. At the other end of the stroke, it has moved tooth #8 into the position where tooth #5 was. The pawl jewel has dropped off the end of tooth #4, and so we have achieved a three-tooth advance.

It can be seen that for any amplitude from just over one tooth to just under three teeth, the index wheel advances one tooth for each vibration of the tuning fork. When the total travel of the index jewel reaches three teeth on the index wheel, this wheel advances more than one tooth for each tuning fork vibration; in fact, it advances three teeth, and under conditions where the tuning fork reached such an amplitude the hands would advance at three times their proper rate.

This demonstration has proven that the index mechanism permits wide variations in tuning fork amplitude before the timepiece hands fail to advance in exact synchronism with the vibrations of the tuning fork. It must be realized that the diagrams are greatly magnified. Actually, in practice, the index wheel is only 95/1000 of an inch in diameter and it contains 300 teeth. However, in spite of these small dimensions the mechanism functions exactly as you have seen in this magnified diagram and experience has shown that this entire system is completely reliable. The fact that the ratchet system is small does not alter in any way the physical principles involved in its operation.

It is not, in practice, possible to determine visually whether the phase between the pawl and the index finger is adjusted to be several teeth plus one-half tooth, as previously indicated. The minute size of the teeth is such that the optical observation is extremely difficult with the facilities ordinarily available.

However, the proper phasing can be determined at the watchmaker's bench by supplying to the watch circuit a voltage less than the ordinary operating voltage of 1.3 volts. A voltage is chosen below one volt at which the amplitude of the tine is just over one tooth. If the watch will then run, this indicates that the adjustment of phasing is correct.

Vernier adjustment of the phasing is accomplished by rotating cam 38 to cause the pawl bridge 37 to pivot about screw 40.

While there has been shown a preferred embodiment of the invention it will be obvious that many changes may be made therein without departing from the essential spirit of the invention as defined in the annexed claims.

What is claimed is:

1. In an electronic timepiece where an electromagnetically-actuated tuning fork mounted on a pillar plate constitutes the timekeeping standard and wherein the gear works of the timepiece are driven to a toothed index wheel; a motion transformer for translating the vibratory action of the fork into rotary motion, said transformer comprising an index finger fixedly attached to one tine of said fork and engaging the teeth of said wheel to transmit turning impulses thereto, and a pawl adjustably mounted on said pillar plate to engage said index wheel at a position relative to said index finger at which the phase between said finger and pawl is several teeth plus one-half tooth.

2. A motion transformer as set forth in claim 1, wherein said pawl is attached to an arm pivotally connected to said pillar plate and adjustable relative thereto to vary the position of said pawl on said wheel.

3. A motion transformer, as set forth in claim 1, wherein said pawl and finger are both formed of flat spring metal and are arranged to press down on said wheel.

*4. In a timepiece wherein a vibratory element constitutes the timekeeping standard and wherein the gearworks of the timepiece are driven by a toothed index wheel, said vibratory element being subject to variations in amplitude; a motion transformer for translating the vibratory action of said element into rotary motion at a rate which is dependent on the vibratory rate of the element and is substantially independent of said variations in amplitude, said motion transformer comprising:*

*(a) an index finger attached to said vibratory element and extending therefrom to engage the teeth of said index wheel to transmit turning impulses thereto,*

*(b) a pawl engaging the teeth of said index wheel to prevent turning thereof in a reverse direction, and*

*(c) means to adjust the interrelation between said pawl and said index finger with respect to the teeth on said wheel to a point at which the phase between said index finger and said pawl is several teeth plus one-half tooth.*

*5. In a timepiece, as set forth in claim 4, wherein said adjustment means includes an arm movable about a pivot point, said pawl being attached to said arm and extending therefrom to engage the teeth of said index wheel, and a rotatable cam having a surface engaging said arm to cause said arm to move about said pivot point as a function of the rotation of said cam, thereby to effect a vernier adjustment in the position of said pawl on said wheel.*

References Cited

The following references, cited by the Examiner, are of record in the patented file of this patent or the original patent.

UNITED STATES PATENTS

| | | | |
|---|---|---|---|
| 2,960,817 | 11/1960 | Hetzel | 74—142 X |
| 2,971,323 | 2/1961 | Hetzel | 74—142 X |

MILTON KAUFMAN, *Primary Examiner.*